United States Patent [19]

Eglise et al.

[11] Patent Number: 4,928,000

[45] Date of Patent: May 22, 1990

[54] METHOD AND APPARATUS FOR COMMUNICATION FOR A DATA-STORING TOKEN

[76] Inventors: David Eglise, 53 Alma Road, Windsor, Berkshire, SL4 3HH; Alan J. Ruddell, 49 Barkham Ride, Wokingham, Berkshire, RG11 4HA, both of United Kingdom

[21] Appl. No.: 211,858

[22] PCT Filed: Oct. 19, 1987

[86] PCT No.: PCT/GB87/00737

§ 371 Date: Aug. 19, 1988

§ 102(e) Date: Aug. 19, 1988

[87] PCT Pub. No.: WO88/02897

PCT Pub. Date: Apr. 21, 1988

[30] Foreign Application Priority Data

Oct. 20, 1986 [GB] United Kingdom ............... 8625074

[51] Int. Cl.$^5$ ............................................. G06F 15/20
[52] U.S. Cl. .................................... 235/380; 364/270; 364/271; 364/241.8; 364/934; 364/940.8; 364/950.3; 235/375; 235/492
[58] Field of Search ... 364/900 MS File, 200 MS File; 331/49; 320/44; 375/12; 235/375, 380, 492

[56] References Cited

U.S. PATENT DOCUMENTS

| | | | |
|---|---|---|---|
| 3,594,656 | 7/1971 | Tsukamoto | 331/49 |
| 4,124,890 | 11/1978 | Vasenkov et al. | 364/200 |
| 4,191,998 | 3/1980 | Carmody | 364/200 |
| 4,241,418 | 12/1980 | Stanley | 364/900 |
| 4,283,621 | 8/1981 | Pembroke | 235/375 |
| 4,719,593 | 1/1988 | Threewitt et al. | 364/900 |
| 4,759,035 | 7/1988 | McGary et al. | 375/12 |
| 4,775,827 | 10/1988 | Ijntema et al. | 320/44 |
| 4,822,985 | 4/1989 | Boggan et al. | 235/380 |

FOREIGN PATENT DOCUMENTS

| | | |
|---|---|---|
| 0032818 | 7/1981 | European Pat. Off. |
| 0098653 | 1/1984 | European Pat. Off. |
| 0147099 | 3/1985 | European Pat. Off. |
| WO85/02275 | 5/1923 | PCT Int'l Appl. |
| WO86/00432 | 1/1986 | PCT Int'l Appl. |
| 2162406 | 1/1986 | United Kingdom |
| 2170337 | 7/1986 | United Kingdom |

OTHER PUBLICATIONS

Patent Abstracts of Japan, vol. 9, No. 224, (P-387), (1947), Sep. 10, 1985, & JP, A, 6081627, (Matsushita Denki Sangyo K.K.), May 9, 1985.
Synchronizing the Operation of a Computing Means with a Reference Frequency Signal (Publication #0161883).

*Primary Examiner*—Harold I. Pitts
*Assistant Examiner*—Gopal C. Ray

[57] ABSTRACT

A data-storing token includes a microprocessor which responds to a signal generated by a token interrogator for altering its clock frequency so as to achieve synchronization between the token and interrogator operations. Additional synchronization is achieved by adjusting the length of delay loops in routines used for communication between the token and the interrogator.

11 Claims, 3 Drawing Sheets

METHOD AND APPARATUS FOR COMMUNICATION FOR A DATA-STORING TOKEN

FIELD OF THE INVENTION

This invention relates to oscillators, and is particularly but not exclusively applicable to oscillators used for generating a clock frequency to control the frequency of operation of a processor, in particular a microprocessor.

Generally, a microprocessor requires a high frequency clock signal applied to a clock input in order to determine the rate of operation of the microprocessor. It is desirable that the clock frequency be of close tolerance with respect to a desired frequency and of high stability, especially in the case where the microprocessor has to perform input and/or output functions which require accurate timing, as this timing will be dependent upon the accuracy of the clock frequency. Generally, in order to achieve accurate and highly stable clock frequencies, crystals are used.

However, the use of crystals results in disadvantages when attempting to produce miniaturized and inexpensive products. Crystals tend to be relatively expensive, mechanically fragile and bulky. They cannot normally be formed as part of an integrated circuit. Ceramic resonators could alternatively be used, but these are also costly and bulky.

It would be possible instead to use an LC or RC oscillator for generating a clock frequency. However, even if several discrete, bulky components were used in order to improve accuracy compared with using merely components formed on integrated circuits, the accuracy and stability of the oscillator would still not be sufficient for many purposes.

DESCRIPTION OF THE RELATED ART

One particular application in which such problems are serious is that of data-storing electronic tokens which are generally coin-sized and shaped, such as those described in EP-A-147099. In one arrangement described therein, a small electronic circuit is provided within a coin-shaped casing, and communication between an interrogator and the circuit is achieved using electromagnetic transmissions from the interrogator. A carrier wave having a predetermined frequency is 100% amplitude modulated by the interrogator in order to transmit data to the token. The token selectively absorbs the carrier wave in a manner dependent upon data to be transmitted to the interrogator by the token. This is detected by the interrogator.

In such an arrangement it is clearly important for the operations of the interrogator and the token to be synchronized. It is fairly easy to arrange for the interrogator's operations to take place at a closely-controlled frequency, so that the frequencies of the carrier wave and the modulation thereof are accurate and very stable, by providing within the interrogator a crystal-controlled oscillator. However, providing the tokens with such oscillators would be extremely inconvenient, not only because of the small size of the tokens but particularly because their widespread use requires that they be very inexpensive and this is not possible when each is provided with a crystal to control the oscillator frequency.

SUMMARY OF THE INVENTION

In accordance with one aspect of the invention there is provided an oscillator which generates a clock for a processor, the oscillator being controllable by the processor in order to adjust the frequency of the clock.

In accordance with another aspect of the invention, a processor coupled to an oscillator is operable to correct the frequency of the oscillator in dependence upon an externally generated frequency, for example the carrier frequency generated by an interrogator in the application described above.

In accordance with a still further aspect of the invention there is provided a circuit comprising a processor, an input for receiving an input signal, and a clock generator for generating a clock for the processor, the clock generator being operable to alter the frequency of the clock in response to a frequency-adjustment signal from the processor, wherein the processor is operable to compare the frequency of its own operation with the frequency of the input signal in order to produce for the generator said frequency-adjustment signal, whereby the processor can thereafter perform processing operations at timings having a predetermined relationship with the frequency of the input signal.

The comparison is preferably effected by the microprocessor counting operations which it performs, each operation taking a predetermined number of cycles of the clock frequency, while the frequency of the signal applied to the input is being counted. The two counts will have a predetermined relationship if the clock is at a desired frequency. The microprocessor can respond to a variation in this relationship by altering the clock frequency. In the preferred embodiment, the counting operation is terminated when one of the counts (preferably the count of the frequency of the input signal) reaches a predetermined number, and at that time the other count is compared with a predetermined value to determine whether and preferably in what manner the frequency of the clock is to be altered.

The arrangements described above have the advantage that the clock generator or oscillator has a frequency which can be adjusted to match a desired frequency so that the oscillator or clock generator itself need not be highly accurate, and consequently can be formed on an integrated circuit without requiring bulky external components. This results in a substantial reduction in cost and size.

It is to be noted that although such an arrangement can be used to generate a clock having a very accurate frequency by appropriate adjustment of the frequency, this is not always essential. For example, in the application described above involving data-storing tokens, in practice the carrier wave generated by the interrogator will be of a highly accurate frequency and consequently the token can perform a synchronizing operation which will result in the processor's clock frequency being highly accurate. However, even if the interrogator's carrier wave were not of a highly accurate frequency, the token's operation and the carrier wave would nevertheless be synchronized so that communications between the token and the interrogator can take place without significant error, despite the fact that the absolute frequency at which this occurs may not be precise.

Although the term "synchronized" is sometimes used in a narrow sense to refer to the relationship between signals having the same frequency and a fixed phase relationship, it will be appreciated that the term is used herein in a broader sense to refer to any fixed relationship between signals or processes, which may have different frequencies. For example, in the preferred embodiment the microprocessor carries out a switching operation to communicate with an interrogator, and the synchronizing operation is performed to ensure that switching occurs at intervals which correspond substantially to a fixed number of cycles of the carrier wave. However, the frequency of the carrier wave would not necessarily be the same as either the processor's clock frequency or the frequency at which particular processing operations took place.

The clock frequency may be adjustable in a number of discrete steps. The processor may be operable to perform a single adjustment of the frequency, but preferably is operable to repeat adjustment until a preferred selection has been made.

In the preferred embodiment described below, the processor is of a type which comprises a counter which can be read by an operation of the processor but which can be incremented in response to an external signal without requiring a specific processing operation to be carried out by the processor. In this way, the processor can repeatedly perform an operation involving the incrementing of a register or other memory location so that it is effectively generating a count at a frequency depending upon its clock frequency, and periodically check the contents of the counter which is incremented by the input signal. In this way, the two counts referred to above can be made.

However, this is not essential. The invention is also applicable to processors which do not have a counter which is automatically incremented by an input signal. The processor itself can perform the operations required to increment a count in response to the input signal. In one arrangement, the processor could continually perform a program loop which always has the same number of machine cycles and during which the processor increments a first counter which will provide a count indicative of the clock frequency and increments a second counter only on detection of a transition of the input signal. It would alternatively be possible to have the processor increment only the first of these counters during the program loop, and to have the other counter incremented during an interrupt routine initiated by a transition of the input signal. In the latter case, however, allowance would need to be made for the extra machine cycles used each time the interrupt routine was performed.

Reference is made herein to "incrementing" one or more counters. It will be appreciated that the purpose of this is to obtain a value which is indicative of, for example, the number of transitions of a signal or the number of times a program loop has been executed. To accomplish this it is merely necessary to have some form of stepwise changing of the contents of the counter, and accordingly the term "incrementing" is to be interpreted broadly to cover such stepwise changing, including the possibility of actually decrementing the contents of the counter.

A further aspect of the invention is concerned with a different technique for controlling the speed at which a processor operates. According to this aspect of the invention, a circuit includes a processor and an input terminal, the processor being operable to compare the frequency at which it operates with the frequency of an input signal at said terminal, and to store one or more values dependent upon the comparison results, and the processor thereafter being operable to perform an input and/or output operation involving a number of machine cycles which is dependent upon the stored value. This aspect of the invention can be used in place of an adjustable-frequency clock generator as described above, whereby the processor runs at a fixed frequency but performs input and/or output operations at a controlled speed so that the operation of the processor appears to by synchronized to the input signal. Thus, as in the example described above, an interrogator and a data-storing token can communicate without requiring that the token have a precisely-controlled and stable clock frequency.

Preferably, however, the present aspect of the invention is combined with the aspects described above, whereby the clock frequency is adjustable by the processor to achieve relatively coarse synchronisation with the input signal, and then more accurate synchronisation of the processor's operations is achieved by comparing the speed at which the processor operates with the input signal frequency and using the difference to control the number of cycles within the processor's input/output operations and thereby the speed of operation.

An arrangement embodying the present invention will now be described by way of example with reference to the accompanying drawings.

BRIEF DESCRIPTION OF THE DRAWINGS

FIG. 3, comprising

DESCRIPTION OF THE PREFERRED EMBODIMENTS

Figure 1:
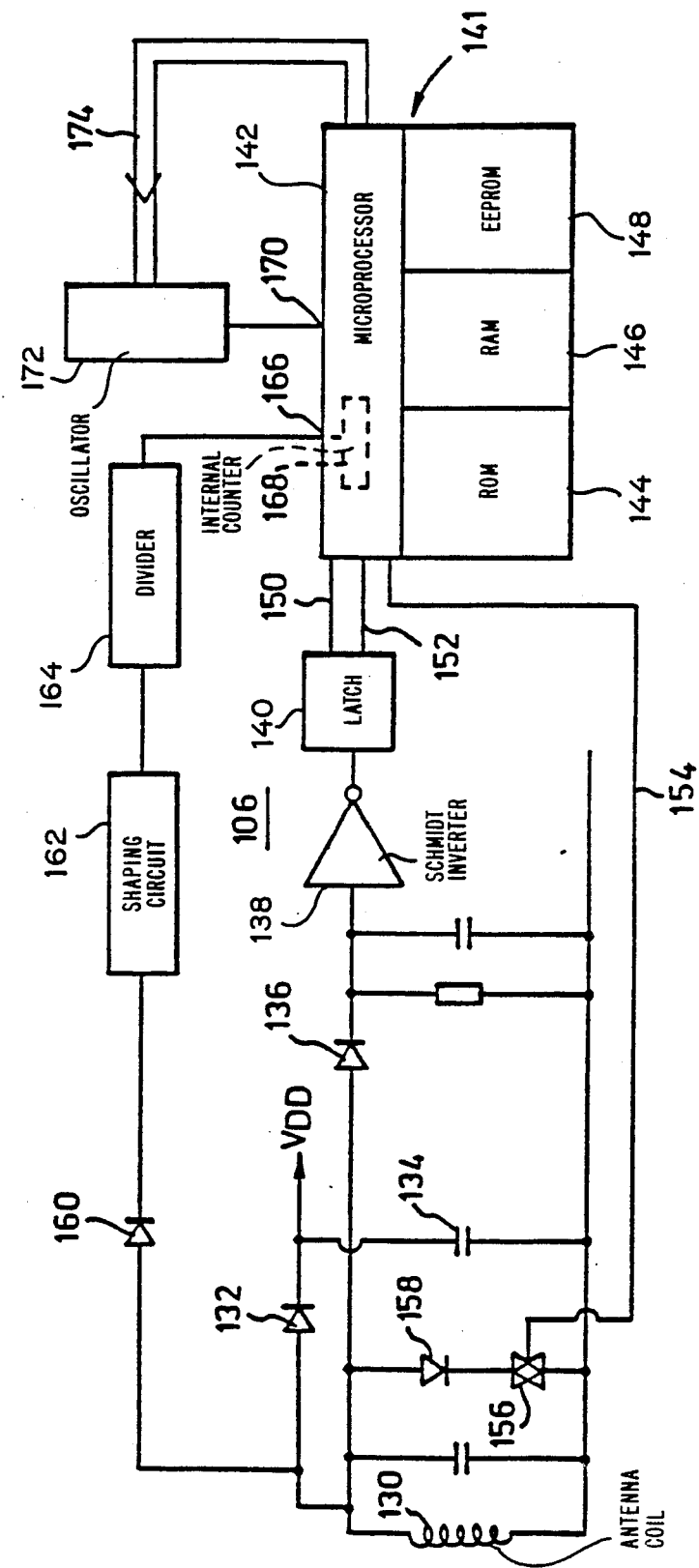
FIG. 1 is a circuit diagram of a data-storing token incorporating a processor circuit according to the invention.

Referring to FIG. 1, the token of the present embodiment is identical to the token of the embodiment of FIGS. 5 to 8 of EP-A-147099, except as described below with regard to the clocking of the microprocessor of the token. The circuit 106 of the token comprises an antenna coil 130 which is connected via a diode 132 to a power storage capacitor 134. The energy transmitted by an antenna of an interrogator which is used to communicate with a token is received by a resonant circuit including the antenna 130, half-wave rectified by the diode 132 and stored by the capacitor 134. The voltage across the capacitor 134 is used to power the circuit 106 of the token. The received carrier is also delivered to a diode 136 which is used for a.m. demodulation purposes. Interruptions in the transmitted carrier result in pulses at the output of diode 136 which are delivered to a Schmidt inverter 138, the output of which is connected to a latch 140. The latch 140 can be read and cleared by a processor circuit 141 comprising a microprocessor 142 which has ROM, RAM and nonvolatile (preferably EAROM or EEPROM) memory circuits 144, 146 and 148, respectively. Demodulated data is delivered to the microprocessor on line 150 and a clear pulse is delivered to the latch on line 152.

The microprocessor 142 has an additional output line 154 which can control an analog switch 156. When the switch is turned on, the terminals of the antenna 130 are shorted by a diode 158.

The lines 150, 152 and 154 would normally be connected to the microprocessor 142 via appropriate interface circuitry (not shown).

By selectively operating the switch 156, the microprocessor 142 can affect the field generated by the application of the carrier wave to the interrogator antenna in accordance with the content of data to be transmitted to the interrogator, and the interrogator can detect this alteration in the field in order to determine this data.

The token of the present embodiment differs from that described in EP-A-147099 insofar as is described in the following.

The signal received by the antenna 130 is delivered via a rectifying diode 160 to a wave shaping circuit 162 which produces at its output square waves having a frequency equal to that of the carrier wave received by the antenna 130. These are delivered to a pre-scaler or frequency divider 164 which divides the frequency by a predetermined number, in this example sixteen. The output of the divider 164 is delivered to a clock input 166 of the microprocessor 142. The microprocessor 142 has an internal counter 168 which is clocked by the pulses appearing at the clock input 166. The contents of the counter 168 can be read by the microprocessor 142.

In the preferred embodiment the processor circuit 141 is of the type 80C49 manufactured by Intel Corporation, 3065 Bowers Avenue, Santa Clara, CA 95051, United States of America. This has an internal counter/timer which can be incremented by pulses applied to the input designated T1 in "MCS-48 (Registered Trade Mark) Family of Single Chip Microcomputers - USER'S MANUAL" published by Intel.

The processor also has a clock input 170 (labelled XTAL1 in the Intel Manual). The pulses applied to this terminal determine the rate at which the microprocessor 142 operates. In this case, these are derived from an oscillator circuit 172. The microprocessor 142 has a plurality of output lines 174 which carry a frequency-adjustment signal. As will be described, this determines the frequency at which the oscillator 172 operates.

The oscillator 172 is an RC oscillator. It may have any of a variety of standard configurations, and has an alterable output frequency dependent upon the switching in or out of appropriate resistance values R or capacitance values C. An example of an oscillator circuit having a switchable frequency is given in Application Note 510, p.6–11, of the 1980 "Linear and Data Acquisition Products" book issued by Harris Semiconductor Products Division, a division of Harris Corporation, Melbourne, Florida, U.S.A. In the present embodiment, the resistance value R and/or the capacitance value C may be switchably altered by the microprocessor 142 applying appropriate digital signals on the output lines 174. The arrangement is preferably such that the output frequency of the oscillator 172 varies monotonically as the digital value on the output lines 174 increases from a minimum to a maximum value.

Figure 2:
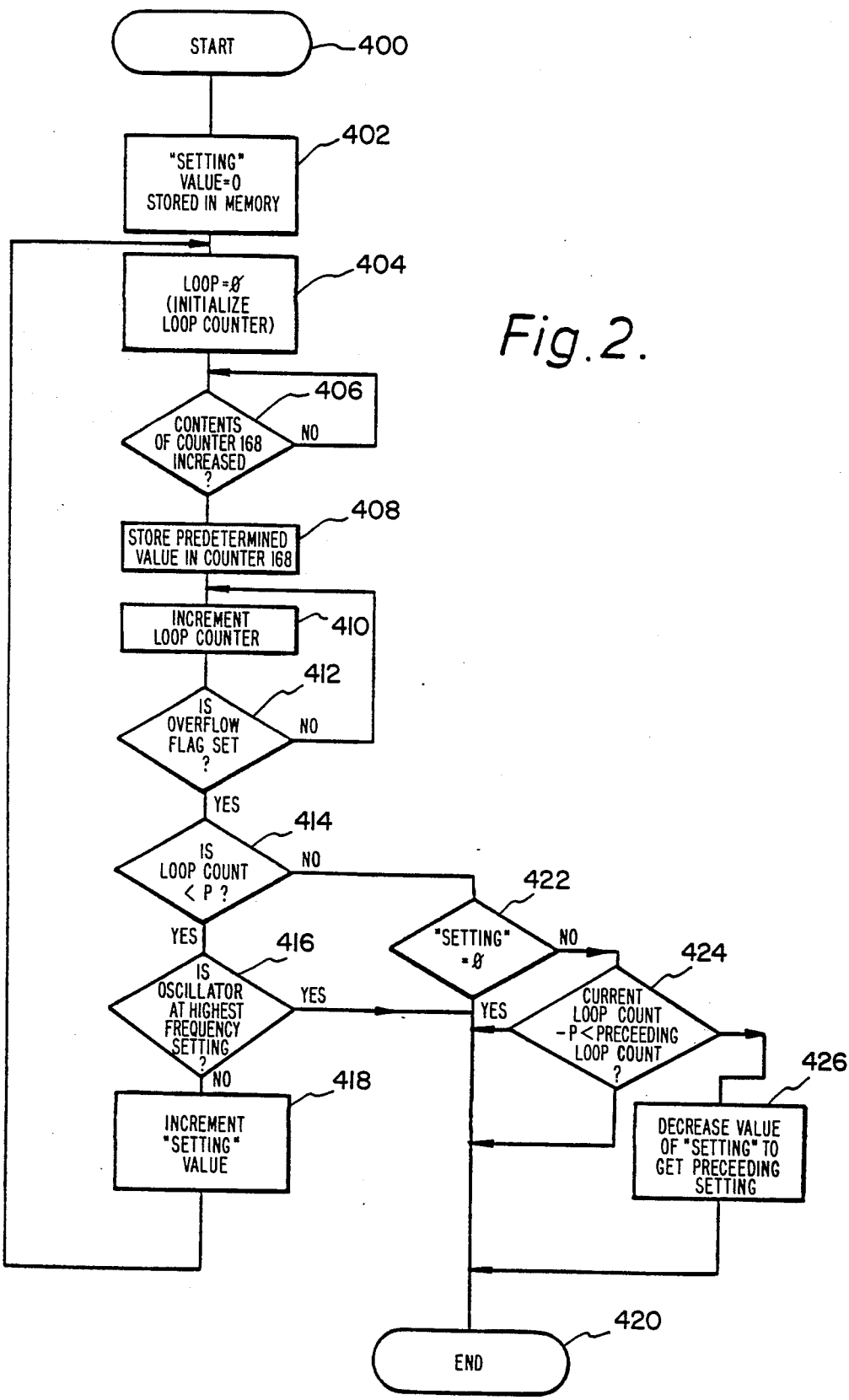
FIG. 2 is a flow chart illustrating a synchronizing operation performed by the processor of the circuit of FIG. 1 in accordance with an aspect of the invention.

The operation of the embodiment will now be described with reference to the flow chart of FIG. 2. After the start of the operation indicated at step 400, which occurs on power-up of the token, the output lines 174 are in the state adopted on reset of the processor 142 so that all the levels of the lines are high and consequently the frequency of the oscillator 172 is at its lowest level and hence the microprocessor 142 is operated at the slowest pace permitted by the oscillator. It is desirable that this state, which results in the lowest power consumption, be the one adopted on power-up. The microprocessor 142 operates in accordance with a program stored in the ROM 144, whereby at a step 402, there is stored in a memory location a "SETTING" value equal to zero, to indicate that the oscillator 172 is at its lowest-frequency setting.

Then, at step 404, a loop counter is initialised by setting its value equal to zero (i.e. LOOP=zero). This counter may be one of the internal registers of the microprocessor 142, or may alternatively be a memory location in for example the RAM 146. At this step the processor also clears the counter 168 and enables it for operation in response to pulses at the input terminal 166.

At step 406 the processor checks the contents of counter 168 to determine whether the contents thereof have increased, i.e. whether a transition of the input signal 166 has been sensed. This step is repeated until the transition is detected. It will be appreciated from the following that such a procedure prevents an inaccuracy of up to one period of the input signal applied to terminal 166 during the timing of the subsequent operation. Alternatively, the processor 142 could directly check the state of the input signal at terminal 166.

At step 408, the microprocessor 142 stores in the counter 168 a predetermined value (XX). During subsequent operations the counter 168 will periodically increment in response to pulses appearing at terminal 166, and when a pulse is received after the counter 168 has reached its maximum value an overflow flag within the microprocessor 142 will be set. The value XX is selected so that the time taken for this to occur, for a given frequency of the input signal applied to terminal 166, is equal to a desired value.

At step 410 the loop counter is incremented, and then at step 412 the overflow flag is checked. Assuming that it has not yet been set, the program loops back to step 410 to increment once more the loop counter.

After the overflow flag has been found to be set, the program proceeds to step 414. Here, the loop count is compared with a predetermined value P. P has been chosen on the basis of the frequency of the signal applied to the input terminal 166 and the value XX stored in the counter 168 so that if the loop count is equal to P, the microprocessor 142 is being clocked at the desired frequency and in synchronism with the input signal applied to terminal 166 (and hence the carrier signal).

At step 414, if the processor determines that the loop count is less than P, the program proceeds to step 416. Here, the SETTING value is checked. Assuming that the oscillator has not yet reached its highest-frequency setting, the program proceeds to step 418. At this point, the SETTING value is incremented, and the signals on lines 174 are altered to correspond to the new value of the setting. This will cause the next higher frequency setting of the oscillator 172 to be achieved. In addition, the processor stores the difference between the loop count and the predetermined value P.

The program then returns to step 404, where the process is repeated to obtain another value for the loop count at the new setting of the oscillator 172.

This process is repeated until either the loop count becomes equal to or greater than P, as determined at step 414, or the highest setting of the oscillator 172 has been reached, as determined at step 416.

In the latter case, the program terminates as indicated at step 420, because the oscillator will be operating at the closest possible frequency to the desired frequency.

In the former case, the program proceeds from step 414 to step 422. This step will only be reached if the preprocessor has determined from the loop count that the clock frequency is greater than or equal to the desired frequency. At step 422, the processor determines whether or not the value of SETTING is equal to zero, i.e. whether or not the oscillator 172 is operating at its lowest frequency. If so, then it will not be possible to operate the oscillator 172 at a frequency closer to the desired frequency and the program therefore ends. Otherwise, the program proceeds to step 424. Here, the magnitude of the difference between the current loop count and P is compared with the difference measured at the preceding setting of the oscillator 172. If the current difference is less than the preceding difference, the program ends. Otherwise, the program proceeds to step 426, where the preceding setting of the oscillator 172 is obtained by decreasing the value of "SETTING" and correspondingly altering the signals applied to lines 174.

It will be appreciated from the above that the oscillator 172 has a plurality of possible settings, and the closest setting to the desired value can be selected. Thus, even if there is a large overall frequency variation between oscillators 172 at a given setting in manufactured devices due to temperature and process variations, the final deviation between the actual frequency of the oscillator in use and the desired frequency will be much smaller than this.

Various modifications to the above embodiment are possible. For example, the program routine referred to above could be modified by having only a single loop counting operation, with the setting of the oscillator then being calculated on the basis of that loop count. Alternatively, any iterative procedure may be used whereby the setting is changed so that the magnitude of the difference between the loop count and the predetermined value is progressively reduced until it becomes less than a predetermined value.

Figure 3A:
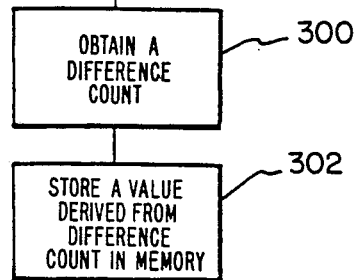
FIGS. 3(A) to 3(C), illustrates steps performed by the processor in carrying out a synchronisation operation according to a further aspect of the invention.
Figure 3B:
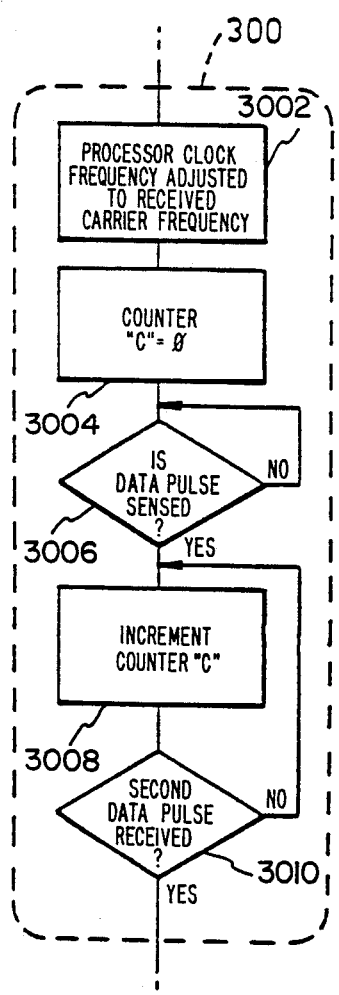
Figure 3C:
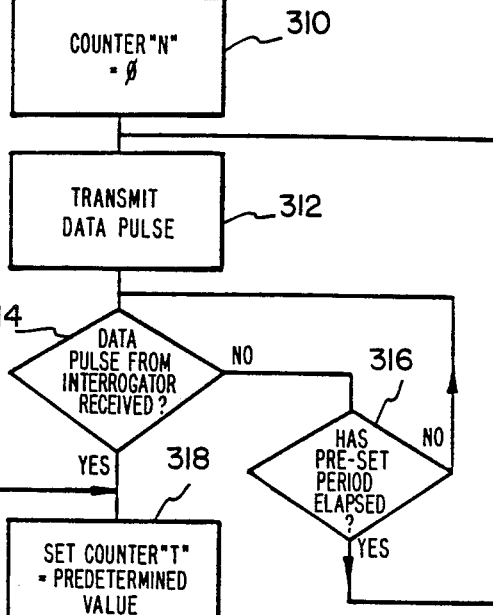

Referring now to FIGS. 3(A) to 3(C), these schematically indicate the operations carried out by a processor in carrying out a synchronisation operation in accordance with a further aspect of the present invention. It is envisaged that this aspect could be used either instead of the operation described with reference to FIG. 2 or, preferably, in addition thereto. The latter procedure has the advantage that for a given desired accuracy of processor timing, the number of output lines 174 can be reduced and/or a wider tolerance in the components determining the frequency of the oscillator 172 is acceptable.

If the techniques described below are to be used in conjunction with the adjustable-frequency oscillator described above, then the circuitry of the token may be identical to that shown in FIG. 1. Otherwise, the circuitry may be identical to that shown in FIG. 1 except for the use of a fixed-frequency oscillator instead of the adjustable-frequency oscillator 172, and the omission of the output lines 174.

Referring to FIG. 3(A), when communication is first established between the interrogator and the token, the processor 142 in the token performs a step 300 in which it obtains a "difference count" representing the deviation between the processor's clock frequency and a nominal frequency. If the techniques described with reference to FIG. 2 are to be used, then step 300 can be formed by the whole of the procedure illustrated in FIG. 2. The difference count would then be the difference between the loop count obtained for the final setting of the adjustable-frequency oscillator and the predetermined value P. Otherwise, step 300 could be achieved by the processor storing a predetermined value in counter 168, and then performing program loops until the counter overflows at which time the difference between the number of loops performed and a predetermined number is recorded as the difference count. In both cases, the loop count itself could alternatively be recorded as the difference count.

The above techniques rely on the difference count being obtained by determining the deviation between a processor's clock frequency and a frequency derived from the carrier signal received by the token antenna. The preferred embodiment uses an alternative technique whereby the difference count is based on a measurement made by the processor of the interval between data pulses received from the interrogator. This measurement will be dependent upon the processor's clock frequency. This is illustrated in FIG. 3(B), which shows a flow chart of a preferred way in which the step 300 of FIG. 3(A) can be carried out. The first procedure, at step 3002, corresponds to the procedure illustrated in FIG. 2, and results in the clock frequency of the processor being adjusted to the received carrier frequency. Then, at step 3004, a counter C is set equal to zero. At step 3006, the program continuously loops until a data pulse from the interrogator is sensed. The program then proceeds to step 3008, wherein the counter C is incremented. Then, at step 3010, the token checks to determine whether a second data pulse has been received. If not, the program loops back to step 3008 to increment the counter C again. This continues until the second data pulse is received, at which time the counter C will contain a measurement by the processor of the interval between successive data pulses, and this will be dependent upon the processor's clock frequency. The contents of this counter C can then be used as the difference count.

Returning to FIG. 3(A), at step 302, the processor stores in a predetermined memory location a value which is derived from the difference count obtained at step 300.

This value is subsequently used during communication procedures to determine the length of time which the processor spends in a delay loop, and thereby determine the total number of cycles in, and hence the speed of, a particular communication operation. An example of this illustrated in FIG. 3(C), which shows how the processor may be arranged to receive an 8-bit byte, assuming that no clock pulses are transmitted.

At step 310, a counter N is set equal to zero. At step 312, the processor causes the token to transmit a data pulse by shorting out the antenna coil for a predetermined period. At step 314, the token checks the received carrier signal to determine whether or not a data pulse from the interrogator has been received. Assuming that no such pulse has been received, the program loops back via step 316 to check again whether such a pulse has been received. This continues until, at step 316, it is determined that a pre-set period has elapsed since the sending of the pulse at step 312. At this time, the program loops back to step 312 to send another pulse.

Accordingly, the program causes the token repeatedly to send pulses at preset intervals until the token receives a pulse from the interrogator as determined at step 314. This pulse is interpreted as a start bit, which is sent in advance of a predetermined number (e.g. 8) of data bits.

The program then proceeds to step 318, at which a counter T is set to the value mentioned above, which is derived from the difference count obtained at step 300. At step 320, it is determined whether the contents of counter T equals 0, and if not, these contents are decremented at step 322, and the program loops back to step 320. Accordingly, there is a delay determined by the difference count before the program proceeds to step 324.

At step 324, the token determines whether a pulse is being received from the interrogator. If not, bit N of a received data byte is set equal to "0", and otherwise the bit N is set equal to "1", at steps 326 and 328, respectively. The program then proceeds to step 330 at which N is incremented, and to step 332 to determine whether N equals the total number of bits to be transmitted. If not, the program loops back to step 318 to obtain the next received bit.

In this manner, the token receives in succession all the bits of a transmitted word. Each bit is expected to be transmitted within a window period which is determined by the difference count obtained at step 300 in FIG. 3(A). Accordingly, if the processor is running slow compared with the interrogator, the difference count will be reduced and therefore the delay loop formed by steps 320 and 322 will be correspondingly shortened to compensate for the slow-running processor.

The difference count could be obtained whenever a token is received by the interrogator. Preferably, however, separate difference counts are obtained every time the interrogator transmits a set of data to the token.

In the above embodiment, the processor stores a single value derived from the difference count for use in the timing loop 320,322. If there are a number of different input/output operations which are needed to be performed by the token, the processor could instead store a different value for each operation, in each case calculating the value using a different algorithm.

In the preferred embodiment, the token only uses the difference count when performing a data receiving operation. The interrogator uses a similar technique when data is transmitted from the token to the interrogator. In other words, the interrogator derives a value dependent upon the calculated interval between pulses transmitted by the token, and uses this value in a delay loop when receiving data from the token. This enables the program routines for receiving data to be similar in the interrogator and the token. Alternatively, the difference count could be used only in the transmission of data, either by the token or the interrogator. Another alternative would be for all the synchronisation to be carried out by the interrogator or, preferably, the token, in which case the difference count would be used both in routines for transmitting data and routines for receiving data.

The precise algorithms used to calculate the or each of the values derived from the difference count will be dependent upon the proportion of the processor cycles involved in the delay loop using the value to the total number of processor cycles involved in the entire input/output operation. This in turn will depend upon the programming of the processor, and can to some extent be controlled by, for example, adding other, fixed delay loops. It may be possible in some or all cases to use the difference count obtained in step 300 as the value for the loop counter, instead of using algorithms to derive difference values. Alternatively, if there is sufficient time the derivation of the loop counter values using appropriate algorithms can form part of the input/output operation.

We claim:

1. A data-storing token which can perform a communication operation involving at least one of transmitting and receiving data in a contactless manner ussing an externally generated signal, said token comprising:
   a clock generator for generating clock pulses, the clock generator including frequency adjustment means for adjusting the frequency of the clock pulses in response to a frequency adjustment signal; and
   a processor arranged for receiving the clock pulses so as to operate at a rate dependent on the frequency of the clock pulses, said processor being arranged to execute a synchronization operation prior to the communication operation, the processor being responsive during the synchronization operation to the externally generated signal for producing the frequency adjustment signal, the frequency adjustment signal being such as to cause the clock frequency to approach a substantially predetermined relationship with the frequency of the externally generated signal, thereby to allow a subsequent synchronized communication operation to occur.

2. A token as claimed in claim 1, wherein the processor is operable to derive the frequency adjustment signal in dependence on the relationship between a first number representing transitions of the externally generated signal during an interval and a second number indicative of the number of times the processor has performed a program loop during the interval.

3. A token as claimed in claim 2, wherein either the first number or the second number is predetermined and the processor is arranged to determine the other number when the predetermined number has been reached, and to derive the frequency adjustment signal in response to the other number.

4. A token as claimed in claim 2, wherein the processor is arranged to determine the number of times the program loop has been performed when a predetermined number of transitions of the externally generated signal has been counted, and to derive the frequency adjustment signal in response thereto.

5. A token as claimed in claim 1, wherein the processor includes a counter which is automatically incremented in response to transitions of the externally generated signal without requiring the processor to carry out a processing operation.

6. A circuit as claimed in claim 1, wherein the processor is operable successively to output a plurality of different frequency adjustment signals in order to select a desired clock pulse frequency from a plurality of frequencies which can be generated by the clock generator.

7. A circuit as claimed in claim 6, wherein the processor is operable to output frequency adjustment signals such as to alter the clock pulse frequency in a progressive manner until the desired frequency has been reached.

8. A circuit as claimed in any one of claims 1 to 7, wherein the processor is operable to store a value indicative of a deviation of the clock pulse frequency from a desired frequency, and subsequently to perform a communication operation involving a number of machine cycles which is dependent on the stored value.

9. A token as claimed in claim 1, wherein the token is operable to perform the communication operation using a radio signal.

10. A token as claimed in claim 9, wherein the radio signal is modulated in accordance with data to be transmitted or received, and wherein the processor is arranged to produce a frequency adjustment signal which is such to cause the clock frequency to approach a substantially predetermined relationship with the carrier frequency of the radio signal.

11. A data-storing token which can perform a communication operation involving at least one of transmitting and receiving data in a contactless manner using an externally generated signal, the token comprising processor means, and a clock generator for generating clock pulses to synchronize the operation of the processor means, the processor means including means for storing a first program for execution by the processor means to control the communication operation, the storing means also storing a second program for execution by the processor means prior to the communication operation to cause the processor means to derive a value representing the deviation of the frequency of the clock pulses from a predetermined relationship with the frequency of the externally generated signal, the first program being arranged such that the number of machine cycles executed by the processor in controlling the communication operation is dependent on the derived value.

* * * * *